United States Patent
Singhal et al.

(10) Patent No.: US 12,346,602 B2
(45) Date of Patent: Jul. 1, 2025

(54) OPERATION EXECUTION ON MEMORY SERVERS

(71) Applicant: HEWLETT PACKARD ENTERPRISE DEVELOPMENT LP, Spring, TX (US)

(72) Inventors: Sharad Singhal, Belmont, CA (US); Rishi Kesh K Rajak, Karnataka (IN); Mashood Abdulla Kodavanji, Karnataka (IN); Cynara Justine, Karnataka (IN); Syed Ismail Faizan Barmawer, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 92 days.

(21) Appl. No.: 18/346,406

(22) Filed: Jul. 3, 2023

(65) Prior Publication Data
US 2025/0013386 A1   Jan. 9, 2025

(51) Int. Cl.
*G06F 3/06* (2006.01)

(52) U.S. Cl.
CPC .......... *G06F 3/0659* (2013.01); *G06F 3/0622* (2013.01); *G06F 3/067* (2013.01)

(58) Field of Classification Search
CPC ....... G06F 3/0659; G06F 3/0622; G06F 3/067
See application file for complete search history.

(56) References Cited

U.S. PATENT DOCUMENTS

| | | | |
|---|---|---|---|
| 5,287,504 A | 2/1994 | Carpenter et al. | |
| 5,734,795 A | 3/1998 | Rogers | |
| 7,082,608 B1 | 7/2006 | Wilson et al. | |
| 7,421,443 B2 | 9/2008 | Rajan et al. | |
| 7,660,793 B2 | 2/2010 | Indeck et al. | |
| 9,065,839 B2 * | 6/2015 | Miller | H04L 67/1097 |
| 2009/0106771 A1 * | 4/2009 | Benner | G06F 12/1466 719/313 |
| 2019/0013965 A1 * | 1/2019 | Sindhu | H04L 12/4633 |
| 2019/0104022 A1 | 4/2019 | Power et al. | |

(Continued)

FOREIGN PATENT DOCUMENTS

WO    2020/115330 A1    6/2020

OTHER PUBLICATIONS

Bienz et al., Node aware sparse matrix-vector multiplication, Jul. 13, 2018 (30 pages).

(Continued)

*Primary Examiner* — Jason W Blust
(74) *Attorney, Agent, or Firm* — Trop, Pruner & Hu, P.C.

(57) ABSTRACT

In some examples, a system includes a plurality of memory servers managing access of data in a memory. A computer node includes a plurality of buffers associated with the memory servers. A processor executes a plurality of functions accessible by the computer node to access the data of the memory servers, the plurality of functions including associating, with the plurality of buffers, information specifying a type of an operation to be performed on the data using the plurality of buffers, queueing the operation in the plurality of buffers, initiating an execution of the operation, based on the type specified by the information, at the memory servers associated with the plurality of buffers, and providing results of the operation from the memory servers to the computer node.

20 Claims, 7 Drawing Sheets

(56) References Cited

U.S. PATENT DOCUMENTS

| | | | |
|---|---|---|---|
| 2019/0188079 A1* | 6/2019 | Kohli | G06F 11/1076 |
| 2020/0136996 A1* | 4/2020 | Li | G06F 12/1081 |
| 2021/0081535 A1 | 3/2021 | Völp et al. | |
| 2021/0133123 A1 | 5/2021 | Feehrer et al. | |
| 2022/0050797 A1* | 2/2022 | Dreier | G06F 12/023 |
| 2022/0138021 A1* | 5/2022 | Rimmer | G06F 15/17331 |
| | | | 718/105 |
| 2022/0317927 A1 | 10/2022 | Blagodurov et al. | |

OTHER PUBLICATIONS

Carter et al., Impulse: Building a Smarter Memory Controller, Nov. 2019 (23 pages).

CXL Compute Express Link: The Breakthrough CPU-to-Device Interconnect CXL, 2022 (2 pages).

De Sensi et al., An In-Depth Analysis of the Slingshot Interconnect, Aug. 20, 2020 (13 pages).

Draper et al., The Architecture of the DIVA Processing In Memory Chip, Jun. 2002 (12 pages).

Ghose et al., Enabling the Adoption of Processing-in-Memory: Challenges, Mechanisms, Future Research Directions, Feb. 2018 (45 pages).

Ghose et al., Processing-in-memory: A workload-driven perspective, Nov./Dec. 2019 (19 pages).

Hn et al., A Scalable Processing-in-Memory Accelerator for Parallel Graph Processing, Jun. 2015 (13 pages).

Keeton et al., The OpenFAM API: a programming model for disaggregated persistent memory, 2018 (26 pages).

NVIDIA, NVIDIA Scalable Hierarchical Aggregation and Reduction Protocol (SHARP), May 2021 (30 pages).

OpenFAM Reference Implementation downloaded May 30, 2023 (4 pages).

Openshmem, Application Programming Interface, Version 1.5, Jun. 8, 2020 (180 pages).

Pfister, Gregory F., Chapter 42, An Introduction to the InfiniBand™ Architecture downloaded Jun. 10, 2023 (16 pages).

Readme, Bale downloaded Jun. 10, 2023 (3 pages).

Research Gate, NDC: Analyzing the impact of 3D-stacked memory+ logic devices on MapReduce workloads, Mar. 2014 (12 pages).

Tierney et al., Efficient Data Transfer Protocols for Big Data, Oct. 2012 (9 pages).

Voltaire, Achieving Breakthrough MPI Performance with Fabric Collectives Offload, Dec. 2010 (12 pages).

Wikipedia, Remote direct memory access last edited on Mar. 27, 2023 (2 pages).

Zhu et al., Accelerating Sparse Matrix-Matrix Multiplication with 3D-Stacked Logic-in-Memory Hardware, 2015 (6 pages).

* cited by examiner

OPERATION EXECUTION ON MEMORY SERVERS

BRIEF DESCRIPTION OF THE DRAWINGS

Some implementations of the present disclosure are described with respect to the following figures.

Figure 1:
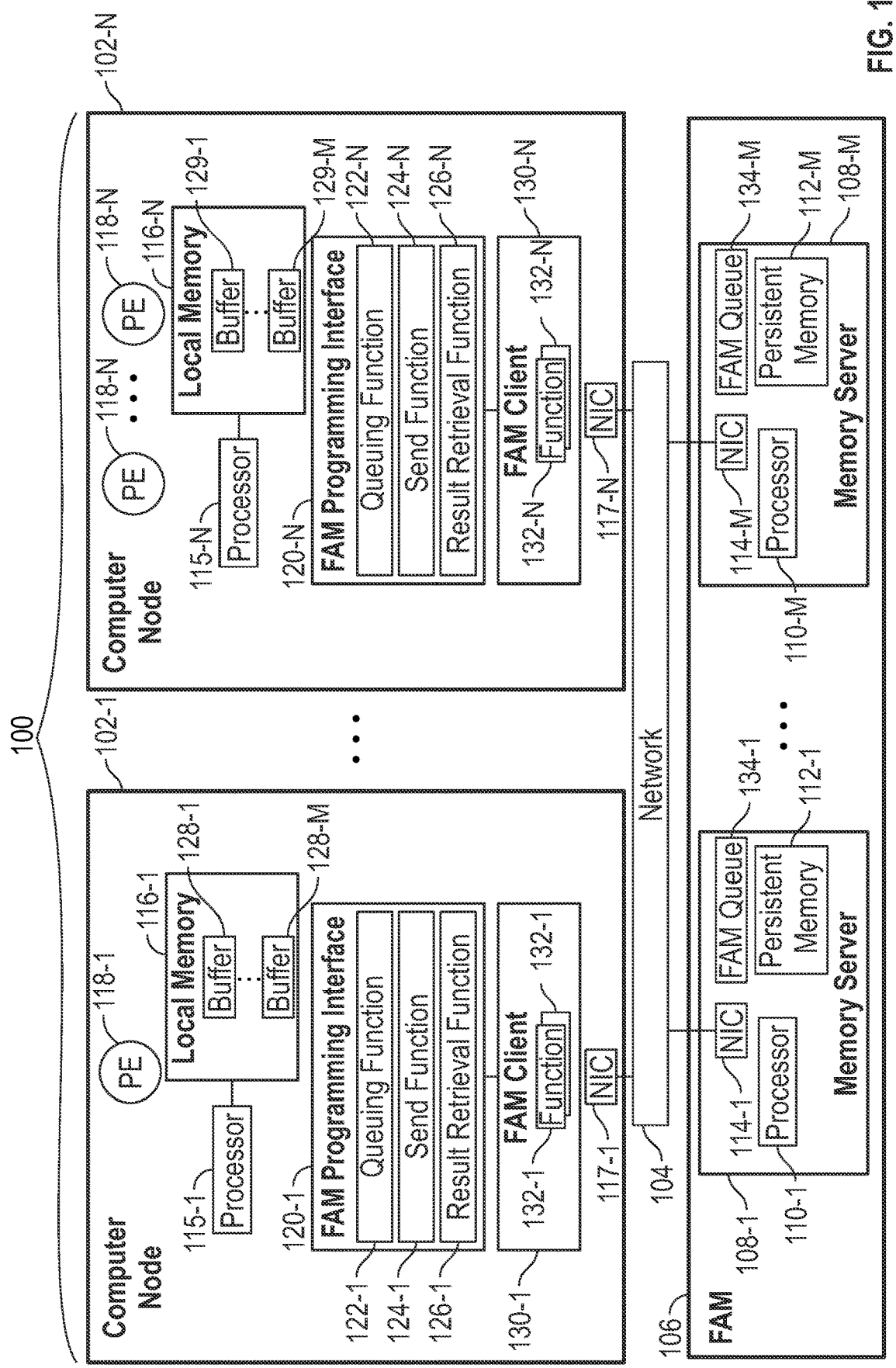
FIG. 1 is a block diagram of an arrangement that includes a cluster of computer nodes coupled to a fabric attached memory, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computations can be offloaded from a computer node over a network to processors of memory servers that are part of a network-attached memory. Such offloading of computations may be associated with various issues. In some approaches, specific hardware can be added to the memory servers and/or the computer node to enable the offloading of computations to the memory servers. However, adding such specific hardware can add cost and complexity to the memory servers or the computer node. In other approaches, an application program is reconfigured to add code for managing the offloading of computations to memory servers. Reconfiguring the application program can increase the complexity of the application program, which can lead to increased development times and costs associated with the application program. Moreover, if there are multiple different types of application programs (possibly from different vendors) that may execute in the computer node, then each of the different types of application programs would have to be reconfigured to support offloading of computations to memory servers of the network-attached memory, which means that program developers would have to spend time and resources in reconfiguring multiple different types of application programs. Moreover, in a large system with a cluster of computer nodes that are interconnected to the network-attached memory, the offloading of computations to memory servers may be associated with a relatively large number of messages between the computer nodes and the memory servers, which can consume processing and network resources.

In accordance with some implementations of the present disclosure, to address one or more of the foregoing issues, a computer node has access to offload-related functions to perform the offloading of computations from the computer node to memory servers of a network-attached memory. Using the offload-related functions accessible by the computer node, a solution based on machine-readable instructions (e.g., software) is provided for offloading computations from the computer node to the memory servers of a network-attached memory, which is more cost effective and less complex than implementing computation offloads using specific hardware. Additionally, the offload-related functions are accessible by application programs in the computer node. The application programs do not have to be modified to add specific code to manage the offloading of computations; the application programs can simply issue requests that can cause execution of the offload-related functions. Further, by supporting the queuing of computations in a queue associated with a memory server of the network-attached memory, the information of the computations can be collected and then sent from the queue to the memory server as part of one write operation, which reduces the quantity of messages communicated over the network to the memory server for offloading the computations to the memory server. Reducing the quantity of messages allows for more efficient use of network resources when offloading computations to memory servers of the network-attached memory.

A network-attached memory refers to a memory that is accessible over a network by one or more computer nodes. A computer node issues, over the network, a request to access data from the network-attached memory. The network-attached memory can be implemented using memory devices, such as persistent memory devices and/or volatile memory devices.

An example of a network-attached memory is a fabric attached memory (FAM). A FAM can include a collection of memory servers. Each memory server can include a persistent memory or may be coupled to a persistent memory. In further examples, each memory server can include a volatile memory or a combination of persistent memory and volatile memory. A memory server manages the access of data in a persistent memory in response to requests from a computer node.

In some examples, a computer node is able to remotely access a persistent memory of a memory server in the FAM using Remote Direct Memory Access (RDMA) over a network. In other examples, a FAM can include a volatile memory or a combination of persistent memory and volatile memory. An RDMA data transfer between a computer node and a memory server includes a transfer of data between the computer node and the persistent memory of the memory server over the network. In some examples, one-sided RDMA is employed to access data of the FAM. With one-sided RDMA, the FAM exposes its persistent memory for access by a computer node based on requests made by the computer node. In contrast, a two-sided RDMA involves tasks performed by processors in the computer node and in a memory server.

A one-sided RDMA data transfer is handled by a network interface of the memory server. In the one-sided RDMA data transfer, data that is read from or written to the persistent memory of the memory server can bypass a processor of the memory server. As a result, the one-sided RDMA data transfer does not involve any work by the processor of the memory server. Because the processor of the memory server is not involved in one-sided RDMA data transfers, the processor may be available for other operations while the memory server is handling RDMA data transfers.

A computer node can perform computations on data of a FAM. Typically, the computations are executed by a processor of the computer node. However, if the processors of the memory servers of a FAM have available processing capacity, it may be desirable to offload the computations from the computer node to the memory servers of the FAM. Offloading computations from computer nodes to memory servers of the FAM may have the following benefits: the offloading reduces the likelihood of overloading processors of the computer nodes, the offloading leverages available capacity of the FAM that would otherwise not be utilized, and performing memory-side computations at the FAM can reduce network traffic in some cases.

Offloading computations from a remote computer node to available processors of memory servers may be associated with various issues as noted above. In accordance with some implementations of the present disclosure, to address one or more of such issues, a computer node has access to functions to perform the offloading of computations from the computer node to memory servers of a FAM. Such functions are referred to as "offload-related functions." A "function" can refer to a routine or a method or any other set of machine-readable instructions for performing a specific task.

The offload-related functions are accessible to the computer node using explicit requests issued by the computer node, such as calls to an application programming interface (API) or a library, for example. Alternatively, the offload-related functions are accessible to the computer node based on activities in the computer node that can trigger execution of the offload-related functions. In some examples, the offload-related functions can include: a buffer descriptor setting function that associates, with multiple buffers in the computer node, information specifying a type of an operation to be performed on data using the multiple buffers; a queueing function to queue the operation in the multiple buffers; an operation initiation function to initiate the execution of the operation at the memory servers associated with the buffers; and a result provision function that provides results of the operation from the memory servers to the computer node. In further examples, there may be additional or alternative offload-related functions accessible by the computer node.

Techniques or mechanisms according to some implementations of the present disclosure can improve computer functionality in a computing system that includes computer nodes and memory servers of a FAM, by using offload-related functions to offload computations from the computer nodes to reduce the likelihood of the computer nodes being overloaded, to make use of available processing capacity of the memory servers of the FAM, and to perform memory-side computations at the FAM to reduce network traffic in some cases.

In some examples, one-sided communications are employed between the computer nodes and the memory servers. A one-sided communication between a computer node and a memory server includes the memory server exposing an interface to the computer node, and the computer node issuing requests to access the memory server. The memory server does not initiate requests to the computer node. By using one-sided communications, consumption of processing resources of the memory servers is reduced as compared to two-sided communications in which both computer nodes and memory servers are able to initiate requests with respect to one another.

The computations offloaded to the memory servers produce results that are stored in the persistent memory of the FAM. Thus, even if a memory server were to crash, the results are persistently stored to allow for a recovery from the memory server crash.

FIG. 1 is a block diagram of an example system 100 that includes multiple computer nodes 102-1 to 102-N (N≥2). The computer nodes 102-1 to 102-N are part of a cluster of computer nodes. The computer nodes 102-1 to 102-N are interconnected by a network 104 to a FAM 106. The FAM 106 includes multiple memory servers 108-1 to 108-M (M≥2). Note that M can be the same as or different from N. More generally, N≥1 and M≥1, which means that the system 100 can include one or more computer nodes and/or one or more memory servers.

Examples of the network 104 can include an interconnect (e.g., a throughput, low-latency interconnect) between processors and memories, which can be based on an open-source standard, a protocol defined by a standards body, or a proprietary implementation. A "computer node" can refer to a computer, a portion of a computer, or a collection of multiple computers.

Each memory server includes a respective processor and persistent memory. For example, the memory server 108-1 includes a processor 110-1 and a persistent memory 112-1, and the memory server 108-M includes a processor 110-M and a persistent memory 112-M. Although referred to in the singular sense, it is noted that each memory server can include one or more processors. Also, in a different example, a persistent memory may be external of the memory server; in this example, the memory server is connected to the persistent memory and is able to access the persistent memory.

A persistent memory can be implemented with one or more persistent memory devices, such as flash memory devices, disk-based storage devices, or other types of memory devices that are able to retain data when power is removed. A processor of a memory server can refer to a central processing unit (CPU) that executes an operating system (OS) and other machine-readable instructions (including firmware such as a Basic Input/Output System (BIOS) and an application program) of the memory server. Alternatively or additionally, a processor of the memory server can refer to another type of processor, such as a graphics processing unit (GPU) that handles specific computations in the memory server.

In other examples, a memory server includes a volatile memory, which is memory that loses its data if power is removed from the memory. A volatile memory can be implemented with one or more volatile memory devices, such as dynamic random access memory (DRAM) devices, static random access memory (SRAM) devices, or other types of memory devices that retain data while powered but lose the data when power is removed. Alternatively, a memory server includes both a volatile memory and a persistent memory.

Each memory server further includes a network interface controller (NIC) to allow the memory server to communicate over the network 104. The NIC can include a transceiver that transmits and receives signals. Further, the NIC can include one or more protocol layers that perform communications over the network 104 according to respective one or more network protocols. The memory server 108-1 includes a NIC 114-1, and the memory server 108-M includes a NIC 114-M.

Each computer node also includes a processor and a local memory. For example, the computer node 102-1 includes a processor 115-1 and a local memory 116-1, and the computer node 102-N includes a processor 115-N and a local memory 116-N. Although referred to in the singular sense, it is noted that each computer node can include one or more processors. A local memory can be implemented using one or more memory devices, which can be any or some combination of the following: a DRAM device, an SRAM device, a flash memory device, or another type of memory device.

Each computer node also includes a NIC to communicate over the network 104. The computer node 102-1 includes a NIC 117-1, and the computer node 102-N includes a NIC 117-N.

A processor of a computer node is able to execute one or more processing elements (PEs). A PE can be a thread or process associated with a program under execution in the computer node. The program can be an application program or another type of program, such as an OS, firmware, and another type of machine-readable instructions. As shown in FIG. 1, the processor 115-1 executes a PE 118-1, and the processor 115-N executes PEs 118-N.

Each PE is able to access data of the FAM 106. The access can include a read access to read data from the FAM 106 or a write access to write data to the FAM 106. Additionally, a PE can perform computations on data read from the FAM 106 or data to be written to the FAM 106. In accordance with some implementations of the present disclosure, a PE executing in a computer node is able to employ a FAM programming interface to offload an operation including computations to one or more memory servers of the FAM 106. If not offloaded, the computations of the operation would have been performed by the processor of the computer node.

In the example of FIG. 1, the computer node 102-1 includes a FAM programming interface 120-1, and the computer node 102-N includes a FAM programming interface 120-N. A FAM programming interface can include an API, a library, or any other program-accessible subsystem that is accessible by a PE in a computer node to request the offload of an operation to one or more memory servers of the FAM 106.

In an example, a FAM programming interface can include an API that includes functions that are useable by computer nodes (or more specifically, by PEs in computer nodes) to manage a FAM and to access data of the FAM. An example of such an API is an OpenFAM API.

Each computer node further includes a FAM client, which is a program executed in the computer node to manage the access of the FAM 106, such as in response to calls to a FAM programming interface by PEs. The computer node 102-1 includes a FAM client 130-1, and the computer node 102-N includes a FAM client 130-N.

In accordance with some implementations of the present disclosure, a FAM programming interface includes offload-related functions that can be called by a PE to perform the offloading of an operation to memory servers of the FAM 106 and to obtain a result of the operation performed by the memory servers of the FAM 106. In the example of FIG. 1, the offload-related functions of the FAM programming interface 120-1 includes a queuing function 122-1, a send function 124-1, and a result retrieval function 126-1. The FAM programming interface 120-N similarly includes a queuing function 122-N, a send function 124-N, and a result retrieval function 126-N. Although specific examples of offload-related functions in a FAM programming interface are depicted in FIG. 1, in other examples, additional or alternative offload-related functions can be included in the FAM programming interface.

Further, in accordance with some implementations of the present disclosure, a FAM client is also able to execute various offload-related functions, which are discussed further below. The FAM client 130-1 is able to execute offload-related functions 132-1, and the FAM client 130-N is able to execute offload-related functions 132-N.

The offload-related functions of a programming interface and a FAM client collectively make up a collection of offload-related functions accessible by a PE in a computer node for performing an offload of an operation to memory servers of the FAM 106.

The following describes the offload-related functions of the FAM programming interface 120-1 in further detail. The discussion applies also to the offload-related functions of the FAM programming interface 120-N.

The PE 118-1 may issue multiple requests for computations to be applied to data of the FAM 106. The computations are part of an operation, such as an indexed vector addition operation that adds data values of vectors based on indexes of the data values, a matrix multiplication operation that multiplies matrices, a scatter operation to scatter data values to targets at corresponding indexes, a gather operation to gather data values from sources at corresponding indexes, a scatter-gather operation that performs both scatter and gather, or another operation in which data is subject to computations. Instead of sending such computations individually as they are invoked over the network 104 to the FAM 106, which may involve a large quantity of messages over the network 104, the computations can instead be aggregated by first queuing the computations in buffers in the computer node 102-1. The queued computations can later be sent to one or more memory servers of the FAM 106.

Moreover, an operation may involve data associated with multiple memory servers. Thus, use of multiple buffers in a computer node for the corresponding memory servers allows for computations for each memory server to be gathered in a corresponding buffer (e.g., computations to be offloaded to a first memory server are queued in a first buffer, computations to be offloaded to a second memory server are queued in a second buffer, and computations to be offloaded to other memory servers are queued in other buffers).

The queuing function 122-1 when called by the PE 118-1 causes queuing of computations into buffers 128-1 to 128-M in the local memory 116-1. More specifically, queuing a computation into a buffer refers to queuing an operation element that includes information that allows the computation to be applied. For example, the operation element can include a memory address (also referred to as an "offset") and a data value. The requested computation of the operation is applied on the data value at the memory address.

Each buffer corresponds to a respective memory server of the FAM 106. For example, the buffer 128-1 corresponds to the memory server 108-1, and the buffer 128-M corresponds to the memory server 108-M. A buffer "corresponds" to a memory server if the buffer is used to queue information of computations that are to be offloaded to the memory server. Similarly, the queuing function 122-N in the computer node 102-N when called by a PE 118-N causes queuing of computations into buffers 129-1 to 129-M in the local memory 116-N.

Although FIG. 1 shows a one-to-one correspondence between buffers and memory servers of the FAM 106, in other examples, one buffer may correspond to multiple memory servers, or alternatively, multiple buffers may correspond to one memory server.

The calling of the queuing function 122-1 of the FAM programming interface 120-1 allows an entity (e.g., the PE 118-1) to explicitly invoke the queuing of computations into a buffer. Alternatively, the queuing of computations can be implicitly requested based on a pattern of activities in the computer node 102-1 or performance hints in the computer node 102-1.

A pattern of activities can include a collection of requests submitted by an entity (e.g., the PE 118-1) relating to the same operation (e.g., indexed vector addition, or another operation involving computations on data). When the FAM client 130-1 detects a quantity of requests in the collection of requests that exceeds a specified quantity threshold, or that the amount of data to be processed for the collection of requests exceeds a specified size threshold, the FAM client 130-1 can automatically trigger the queuing of the computations of the collection of requests to offload to memory servers of the FAM 106, without any explicit call of the queuing function 122-1 in the FAM programming interface 120-1. More generally, the FAM client 130-1 can trigger queuing of computations for offloading to memory servers without an explicit call of the FAM programming interface 120-1 in response to determining that a pattern of activities indicates a relatively large quantity of computations that would benefit from offloading to the memory servers of the FAM 106.

Performance hints can include information in the computer node 102-1 setting a performance goal to be achieved when performing an operation in the computer node 102-1. A performance hint can be in the form of a target time to complete the operation, a target rate of execution of instructions by a processor when performing the operation, or another parameter indicating a performance goal. If the FAM client 130-1 determines that the performance goal cannot be achieved at the computer node 102-1, the FAM client 130-1 can automatically trigger the queuing of the computations of the collection of requests to offload to memory servers of the FAM 106, without any explicit call of the queuing function 122-1 in the FAM programming interface 120-1. More generally, the FAM client 130-1 can trigger queuing of computations for offloading to memory servers without an explicit call of the FAM programming interface 120-1 in response to determining that a performance criterion indicated by performance hints cannot be met if the operation is performed at the computer node 102-1.

The send function 124-1 when called by the PE 118-1 causes the computations queued in one or more buffers in the local memory 116-1 to be sent over the network 104 to respective memory server(s) of the FAM 106. For example, the PE 118-1 can invoke the send function 124-1 to send computations queued in all or a subset of the buffers 128-1 to 128-M to respective memory servers 108-1 to 108-M.

Computations sent by computer nodes to the memory servers can be queued into FAM queues at the memory servers. The memory server 108-1 includes a FAM queue 134-1 into which offloaded computations from any of buffers 128-1 and 129-1 are queued, and the memory server 108-M includes a FAM queue 134-M into which offloaded computations from any of buffers 128-M and 129-M are queued. Note that in some examples, a FAM queue can include multiple buffers, one to store data and the other to store control information relating to the operation to be applied on the data.

The calling of the send function 122-2 of the FAM programming interface 120-1 allows an entity (e.g., the PE 118-1) to explicitly invoke the sending of queued computations to one or more memory servers. Alternatively, the sending of queued computations to a memory server can be implicitly requested based on a state of a buffer or based on a status of the memory server. For example, a state of a buffer can be a buffer full condition of the buffer, which refers to how full the buffer is. If the FAM client 130-1 detects that the buffer exceeds a specified fullness threshold (e.g., more than 75% full, more than 90% full, 100% full, or another threshold value), then the FAM client 130-1 automatically triggers the sending of the queued computations from the buffer to the memory server.

A state of a memory server can refer to an available processing capacity of the processor of the memory server. The memory server can provide an indication of usage of the processor of the memory server to the FAM client 130-1. The indication of usage can be expressed as a percentage used (e.g., 10% used, 40% used, 90% used, or another percentage used value). If the processor of the memory server is lightly used, then that indicates that the processor has greater available capacity.

The result retrieval function 126-1 when called by the PE 118-1 retrieves a result of an operation from one or more memory servers of the FAM 106 to which computations have been offloaded. For example, a memory server can provide a completion indication that an operation is complete. The PE 118-1 can call the result retrieval function 126-1 to determine a status of the operation at the memory server, and if the operation is complete as indicated by the completion indication, the result retrieval function 126-1 retrieves the result of the operation from the memory server. In some examples, the result retrieval function 126-1 is a function to access a wait object (waitObj). A wait object causes a first thread (e.g., the PE 118-1) to pause execution pending completion of an operation by a second thread (e.g., a thread in the memory server to which the operation has been offloaded). The wait object can include a status indicator to indicate whether or not the operation has completed. In other examples, other types of status indicators can be employed to allow a memory server to indicate that an offloaded operation has been completed.

Figure 2:
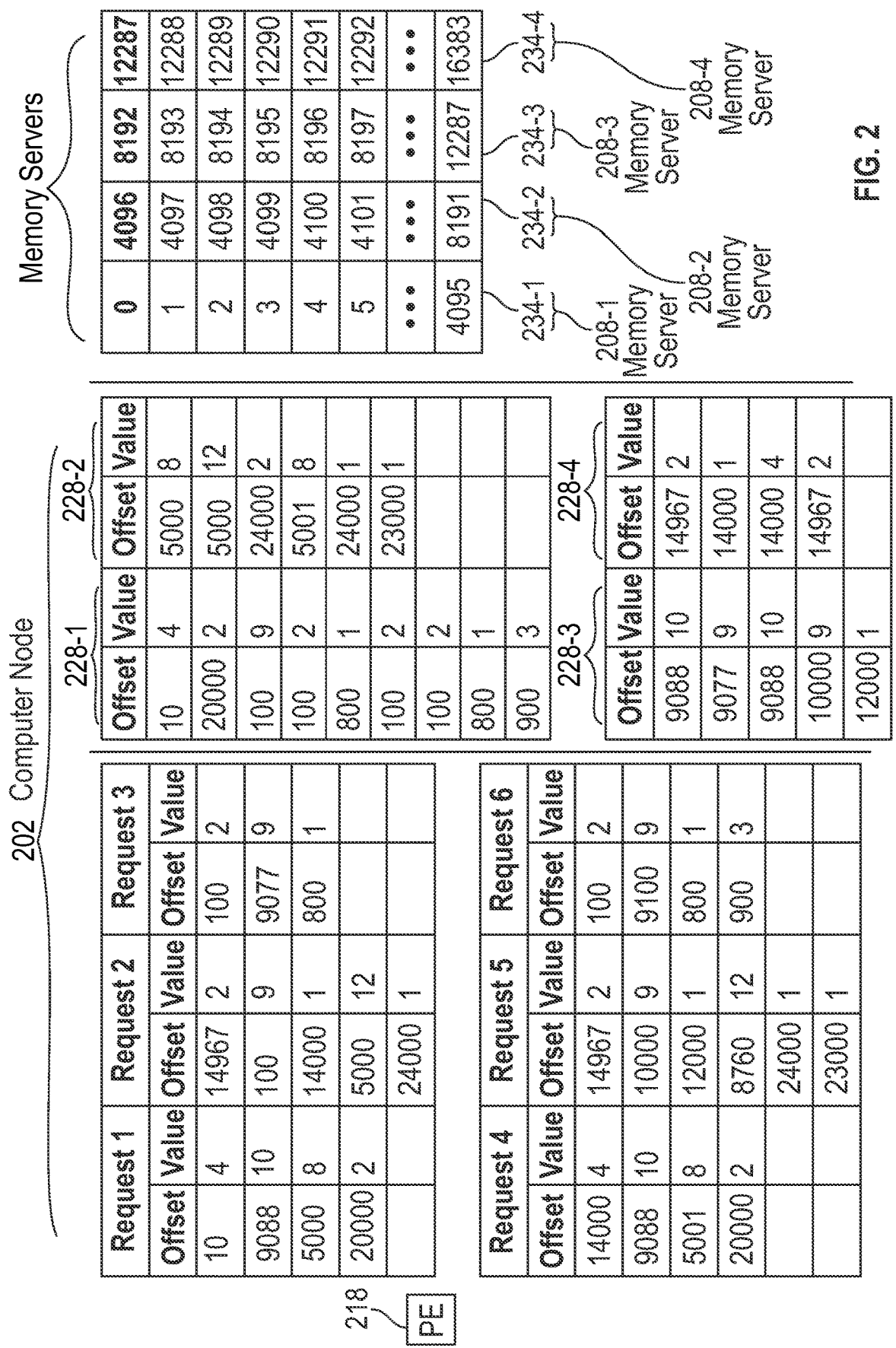
FIG. 2 is a block diagram of requests, buffers storing operation elements specified by the requests, and queues in memory servers, according to some examples.

FIG. 2 shows an example of queuing computations into buffers 228-1, 228-2, 228-3, and 228-4 in a computer node 202. The buffers 228-1, 228-2, 228-3, and 228-4 are examples of any of the buffers 128-1 to 128-M or 129-1 to 129-M of FIG. 1, and the computer node 202 is an example of any of the computer nodes 102-1 to 102-N of FIG. 1. The computations queued into the buffers 228-1 to 228-4 are later sent to corresponding memory servers 208-1, 208-2, 208-3, and 208-4. More specifically, computations queued into the buffer 228-1 are sent to the memory server 208-1, computations queued into the buffer 228-2 are sent to the memory server 208-2, computations queued into the buffer 228-3 are sent to the memory server 208-3, and computations queued into the buffer 228-4 are sent to the memory server 208-4. The memory servers 208-1 to 208-4 are examples of the memory servers 108-1 to 108-M of FIG. 1. The buffers 228-1 to 228-4 are included in a local memory of the computer node 202 (e.g., any of local memories 116-1 to 116-N in FIG. 1).

In the example of FIG. 2, a PE 218 in the computer node 202 issues requests (including request 1, request 2, request 3, request 4, request 5, and request 6) for computations to be performed as part of an operation. In the example of FIG. 2, the operation requested by the requests 1-6 can be an indexed vector addition or any other type of operation, such as a matrix multiplication, a scatter operation, a gather operation, a scatter-gather operation, a sort operation, a merge operation, or another operation in which data is subject to a computation. The PE 218 is an example of any of PEs 118-1, 118-N of FIG. 1.

Each request issued by the PE 218 includes a number of offset-value pairs. The offset represents a memory address used at the computer node 202, and the value associated with the offset represents a data value that is subjected to the requested operation.

Each offset-value pair of a request is referred to as an operation element on which the requested operation is to be applied. Different offsets can map to different memory servers. For example, the computer node 202 can store mapping information that maps offsets to memory servers. The operation elements in the requests 1-6 are added to different buffers 228-1 to 228-4 based on offsets of the operation elements. For example, the operation element (10, 4) of request 1 is added to the buffer 128-1, the operation element (5000, 12) of request 2 is added to the buffer 120-2, the operation element (9088, 10) of request 4 is added to the buffer 128-3, and the operation element (14967, 2) of request 6 is added to the buffer 128-4.

Once the operation elements of the requests 1-6 have been accumulated into the buffers 228-1 to 228-4, the computer node 202 can send the operation elements in the buffers 228-1 to 228-4 to the respective memory servers 208-1 to 208-4. More specifically, the operation elements in the buffer 228-1 are sent to the memory server 208-1, which are queued into a FAM queue 234-1 at the memory server 208-1. Similarly, the operation elements in the buffer 228-2 are sent to the memory server 208-2 and queued in a FAM queue 234-2, the operation elements in the buffer 228-3 are sent to the memory server 208-3 and queued in a FAM queue 234-3, and the operation elements in the buffer 228-4 are sent to the memory server 208-4 and queued in a FAM queue 234-4. The FAM queues 234-1 to 234-4 are examples of FAM queues 134-1 to 134-M in FIG. 1.

The numbers included in each of the FAM queues 234-1 to 234-4 represent memory addresses of the memory address space used by the memory servers 208-1 to 208-4. In some examples, the memory address space in the computer node 202 (including the offsets shown in FIG. 2, for example) can be different from the memory address space used at the memory servers. A translation between the offsets of the memory address space of the computer node 202 to the memory addresses of the memory address space of the memory servers can be performed at the computer node 202, such as by a FAM client or a different entity.

Figure 3:
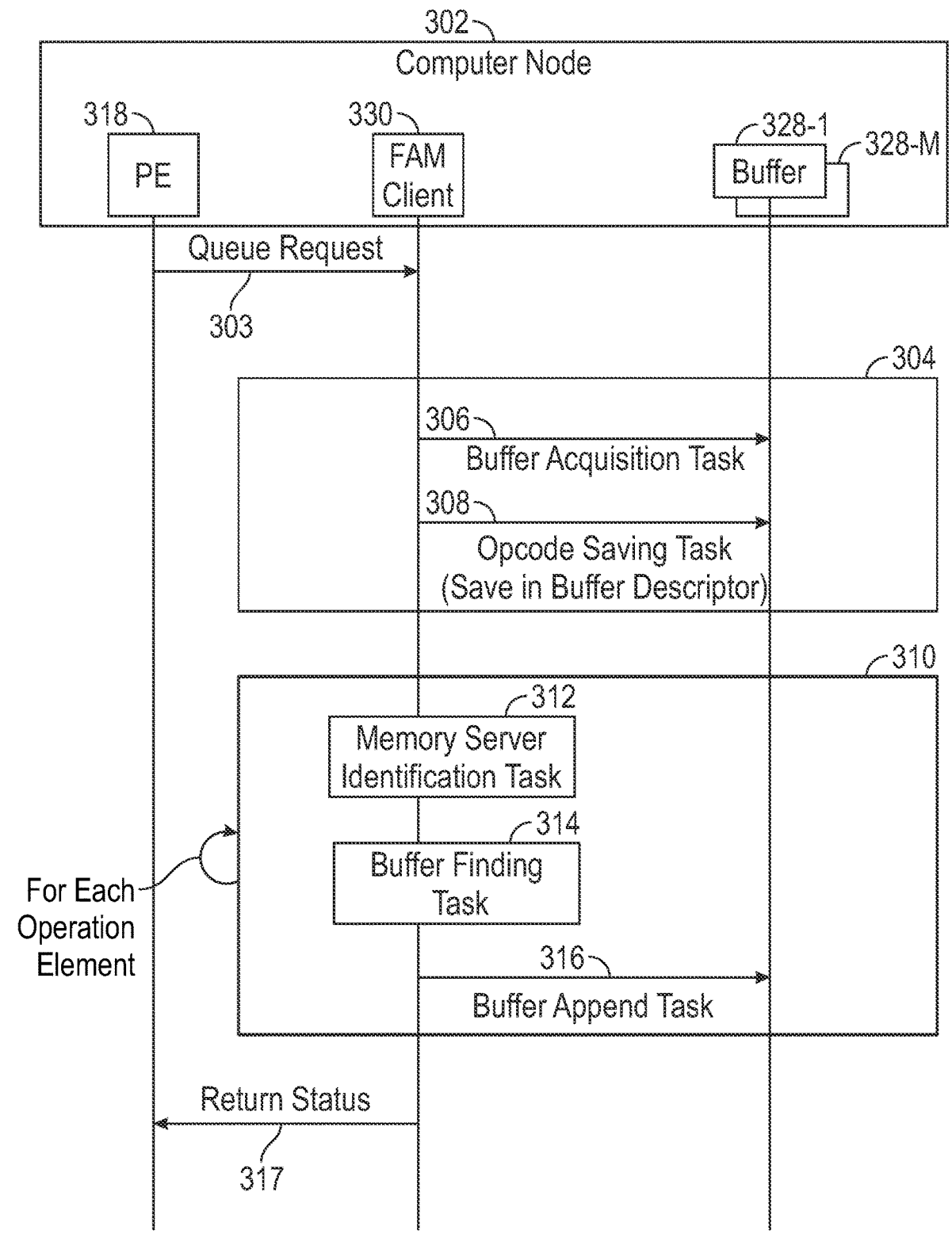
FIG. 3 is a flow diagram of a flow for queuing an operation in buffers of a computer node, according to some examples.

FIG. 3 is a flow diagram of a flow to queue computations (e.g., the operation elements of the requests of FIG. 2) in buffers 328-1 to 328-M in a computer node 302, according to some examples. The flow of FIG. 3 is performed in the computer node 302. The buffers 328-1 to 328-M are examples of any of the buffers 128-1 to 128-M or 129-1 to 129-M of FIG. 1, and the computer node 302 is an example of any of the computer nodes 102-1 to 102-N of FIG. 1.

A PE 318 in the computer node 302 issues (at 303) a queue request, such as by calling a queuing function (e.g., any of queuing functions 122-1 to 122-N of FIG. 1). The PE 318 is an example of any of the PEs 118-1 to 118-N of FIG. 1. In the FIG. 3 example, it is assumed that the queuing of computations in the buffers 328-1 to 328-M is explicitly requested. In other examples, as noted above, the queuing of computations in the buffers 328-1 to 328-M can be implicitly triggered by a FAM client 330 in the computer node 302. The FAM client 330 is an example of any of the FAM clients 130-1 to 130-N of FIG. 1.

The FAM client 330 receives an indication of the queue request issued by the PE 318. In response, the FAM client 330 performs tasks in a block 304. The tasks of the block 304 are performed once in response to the queue request.

The tasks in the block 304 include a buffer acquisition task 306 in which the FAM client 330 acquires a collection of buffers for memory servers that are part of a given memory address space. In some examples, the computer node 302 can use multiple memory address spaces, which may be for different use cases, for example. Each memory address space may include a different collection of memory servers. Depending on which memory address space is used, a different collection of buffers can be acquired by the FAM client 330. The collection of buffers is acquired from a pre-allocated buffer pool that includes buffers for all memory servers of a FAM (e.g., the FAM 106 in FIG. 1).

In some examples, the queuing function called by the PE 318 can have the following syntax:

FAM_Queue_Function(FAM_Queue_OP, FAM_Descriptor, Elements_Set).

Although the above depicts three arguments, FAM_Queue_OP, FAM_Descriptor, Elements, it is noted that the queuing function 122-1 can include additional or alternative arguments in other examples. FAM_Queue_OP represents the type of operation to be performed, such as an indexed vector addition, a matrix multiplication, or another type of operation. FAM_Descriptor represents the given memory address space in which the operation of the specified type (FAM_Queue_OP) is to be applied. Elements_Set represents the operation elements (from one or more requests such as requests 1-6 in FIG. 2) that are to be queued.

The tasks in the block 304 further include an operation code (opcode) saving task 308 in which the FAM client 330 saves information of the opcode (representing the type of operation indicated by FAM_Queue_OP) along with memory addresses of the buffers 328-1 to 328-M into a buffer descriptor. The memory addresses of the buffers 328-1 to 328-M are the addresses in a local memory at which the buffers 328-1 to 328-M are located. The buffer descriptor is a data structure, stored in a memory (e.g., the local memory 116-1 or 116-N of FIG. 1) that can be later accessed (e.g., by the FAM client 330 in response to a request to send queued computations to memory servers) to determine where the buffers 328-1 to 328-M are located in the local memory and what type of operation is to be applied. The buffer descriptor is part of metadata associated with the buffers 328-1 to 328-M.

Block 310 includes tasks that are to be performed for each operation element (in Elements_Set) that is to be queued. The tasks in block 310 include a memory server identification task 312 in which the FAM client 330 identifies a memory server for an offset of a current operation element (in Elements_Set) that is to be queued. As noted above, different offsets can be mapped to different memory servers. The "current" operation element is the operation element that is currently being processed by the FAM client 330 for queuing. The FAM client 330 iterates through tasks of the block 310 for all operation elements of Elements_Set.

The tasks in block 310 further include a buffer finding task 314 in which the FAM client 330 identifies a buffer for the identified memory server. The FAM client 330 may maintain mapping information that correlates buffers to corresponding memory servers. The tasks in block 310 further include a buffer append task 316 in which the FAM client 330 appends the current operation element, including an (offset, value) pair, for example, to the identified buffer.

Once all operation elements of Elements_Set have been queued to the buffers 328-1 to 328-M, the FAM client 330 returns (at 317) a status for the queue request to the PE 318.

The status can be communicated through the FAM programming interface (e.g., 120-1 in FIG. 1).

Other computer nodes can perform a similar flow to queue computations in the other computer nodes.

Figure 4:
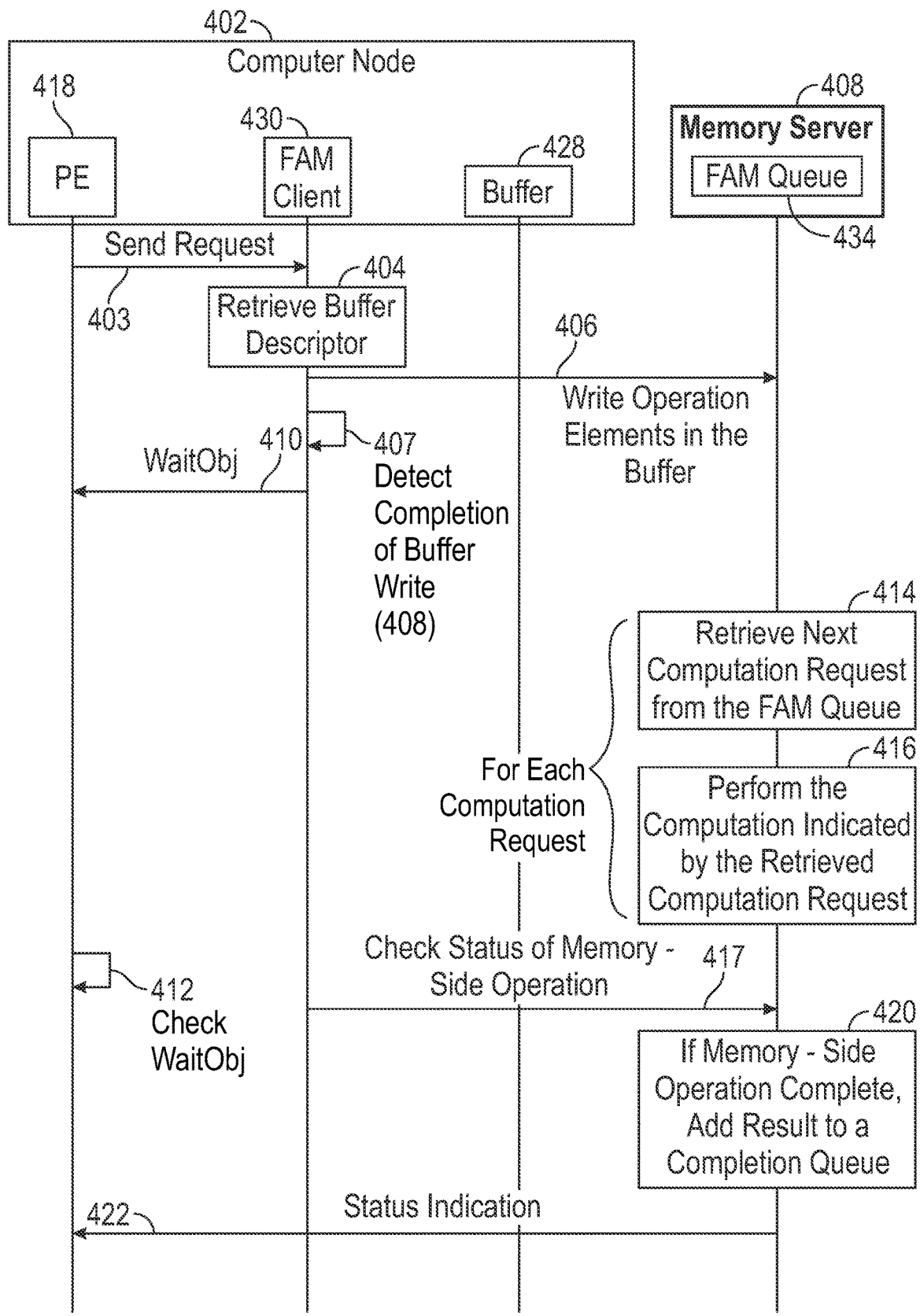
FIG. 4 is a flow diagram of a flow for sending an operation queued in buffers of a computer node to memory servers for execution, according to some examples.

FIG. 4 is a flow diagram of a flow of sending queued computations from a buffer 428 in a computer node 402 to a memory server 408 to perform an offloaded memory-side operation. The buffer 428 is an example of any of buffers 128-1 to 128-M or 129-1 to 129-M of FIG. 1, and the memory server 408 is an example of any of memory servers 108-1 to 108-M of FIG. 1. The computer node 402 is an example of any of computer nodes 102-1 to 102-N of FIG. 1.

A PE 418 in the computer node 402 issues (at 403) a send request, such as by calling a send function (e.g., any of send functions 124-1 to 124-N in FIG. 1). In the FIG. 4 example, it is assumed that the sending of computations queued in the buffer 428 is explicitly requested. In other examples, as noted above, the sending of computations queued in the buffer 428 can be implicitly triggered by a FAM client 430 in the computer node 402. The FAM client 430 is an example of any of FAM clients 130-1 to 130-N of FIG. 1.

The FAM client 430 receives an indication of the send request issued by the PE 318. In response, the FAM client 430 retrieves (at 404) the buffer descriptor associated with the buffer 428. Note that the buffer descriptor includes the opcode representing the type of operation to be performed and memory addresses of buffers.

If the buffer 428 is not empty, the FAM client 430 writes (at 406) the operation elements in the buffer 428 to a memory server 408. The memory server 408 is an example of any of memory servers 108-1 to 108-M. If the send request is a request to send the operation elements of multiple buffers to corresponding memory servers, then the FAM client 430 writes operation elements in each of the other non-empty buffers to the corresponding memory server.

Once the FAM client 430 detects (at 407) that the write of the operation elements in the buffer 428 to the memory server 408 is complete, the FAM client 430 returns (at 410) a wait object, waitObj, to the PE 418.

The wait object, waitObj, can include a status indicator to indicate whether or not the operation has completed. The wait object, waitObj, can further include other information, such as information of a request that triggered the operation (e.g., an identifier of the request), or further information. The wait object, waitObj, is used by the PE 418 for obtaining a status of the offloaded memory-side operation. If the offloaded memory-side operation is complete, the PE 418 can obtain the result of the memory-side operation. The result can include a sum generated by an indexed vector addition, a product generated by a matrix multiplication, or another result of a computation.

The operation elements from the buffer 428 along with information indicating the operation to be applied (as indicated by the opcode in the buffer descriptor) are added to a FAM queue 434 in the memory server 408. The FAM queue 434 is an example of any of FAM queues 134-1 to 134-M of FIG. 1. The combination of the information indicating the operation and the operation elements constitutes computation requests that are queued in the FAM queue 434.

When the computation requests are queued to the FAM queue 434, a processor in the memory server 408 (or more specifically a memory server thread executing on the processor in the memory server 408) retrieves (at 414) the next computation request from the FAM queue 434 and performs (at 416) the computation indicated by the retrieved computation request. The memory server thread iterates through each of the computation requests in the FAM queue 434 to perform the offloaded memory-side operation.

The PE 418 can periodically or intermittently check (at 412) waitObj, such as by calling a result retrieval function (e.g., any of 126-1 to 126-N of FIG. 1), to determine the status of waitObj for obtaining a result of the offloaded memory-side operation. The calling of the result retrieval function by the PE 418 causes the FAM client 430 to check (at 417) the status of the memory-side operation executed at the memory server 408.

When the memory server thread has completed computations of all computation requests in the FAM queue 434, the memory server 408 adds (at 420) a result (e.g., sum, product, or another computation result) of the offloaded memory-side operation to a completion queue. The completion queue can be part of the persistent memory 112-1 of the memory server 108-1, for example. If the memory server 408 has not yet completed the memory-side operation, the PE 418 obtains (at 420), from the memory server 408, a status indication that indicates an incomplete or in-progress status of the memory-side operation. However, if the memory-side operation is complete and the completion queue contains the result of the memory-side operation, the PE 418 obtains (at 420), from the memory server 408, a status indication that indicates a completion of the memory-side operation. If the status indication indicates that the memory-side operation is complete, the PE 418 calls the result retrieval function to obtain the result from the completion queue of the memory server 408.

As noted above, the PE 418 periodically or intermittently checks the wait object, waitObj, by calling the result retrieval function. If the PE 418 determines from a first call of the result retrieval function that the memory-side operation is not yet complete, the PE 418 can later make one or more other calls of the result retrieval function to determine if the memory-side operation is complete.

In alternative examples, instead of the PE 418 repeatedly polling a memory server for a status of an offloaded memory-side operation, the memory server can push a completion indication to the PE 418 when the memory-side operation completes, at which point the PE 418 can retrieve the result of the memory-side operation.

Figure 5:
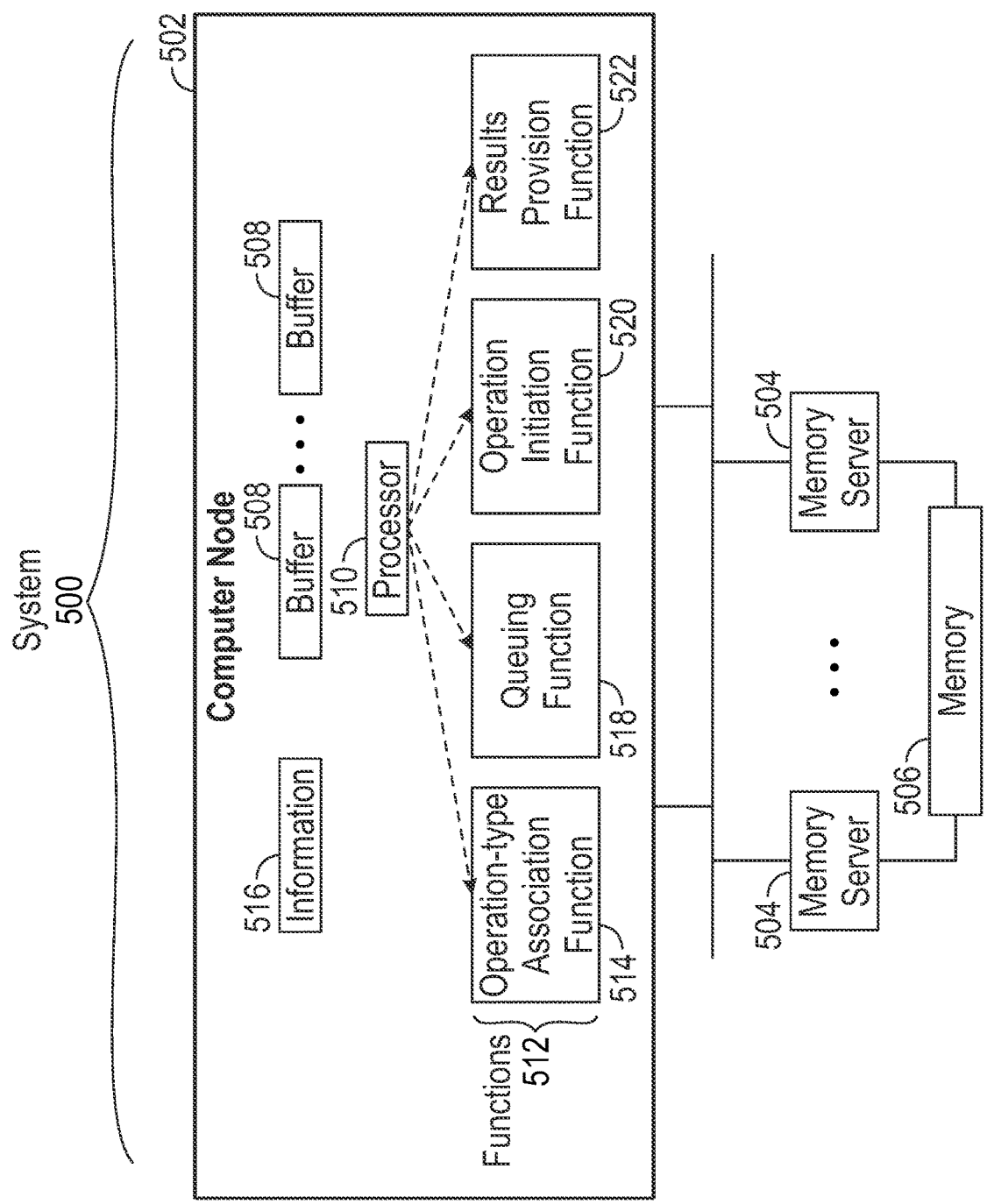
FIG. 5 is a block diagram of a system according to some examples.

FIG. 5 is a block diagram of a system 500 according to some examples. The system 500 includes a computer node 502. In other examples, the system 500 can include more than one computer node.

The system 500 further includes a plurality of memory servers 504 that manage access of data in a memory 506 (e.g., a persistent memory and/or a volatile memory). The memory 506 can include memory devices accessible by corresponding memory servers 504.

The system 500 further includes a plurality of buffers 508 in the computer node 502. The plurality of buffers 508 are associated with the memory servers 504.

The system 500 includes a processor 510 configured to execute a plurality of functions 512 accessible by the computer node 502 to access the data of the memory servers 504. The processor 510 can be part of the computer node 502. The plurality of functions 512 can include functions of a programming interface and functions of a FAM client, for example.

The plurality of functions 512 include an operation-type association function 514 associating, with the plurality of buffers 508, information 516 specifying a type of an operation to be performed on the data using the plurality of buffers 508. Associating information specifying a type of operation with a buffer can refer to including or adding the information in a descriptor or other data structure. In some examples, the information 516 can include a buffer descriptor. The operation-type association function 514 can be part of a FAM client and can perform the opcode saving task 308 of FIG. 3, for example.

The plurality of functions 512 include a queuing function 518 queuing the operation in the plurality of buffers 508. Queuing an operation into a buffer can refer to adding, to the buffer, information that allows the operation to be performed. The queuing function 518 can be the queuing function 122-1 or 122-N in the FAM programming interface 120-1 or 120-N of FIG. 1, for example.

The plurality of functions 512 include an operation initiation function 520 initiating an execution of the operation, based on the type specified by the information 516, at the memory servers 504 associated with the plurality of buffers 508. Initiating an execution of an operation at a memory server can refer to sending information to the memory server that causes the operation to be started. In some examples, the initiating of the execution of the operation at the memory servers 504 includes writing operation elements of the operation queued in the plurality of buffers to the memory servers and includes providing the information 516 of the type of the operation to the memory servers 504.

The plurality of functions 512 include a results provision function 522 providing results of the operation from the memory servers 504 to the computer node 502. Providing a result of an operation to a computer node can refer to sending the result to the computer node or retrieving the result by the computer node. The results provision function 522 can be the result retrieval function 126-1 or 126-N of the FAM programming interface 120-1 or 120-N of FIG. 1, for example.

Figure 6:
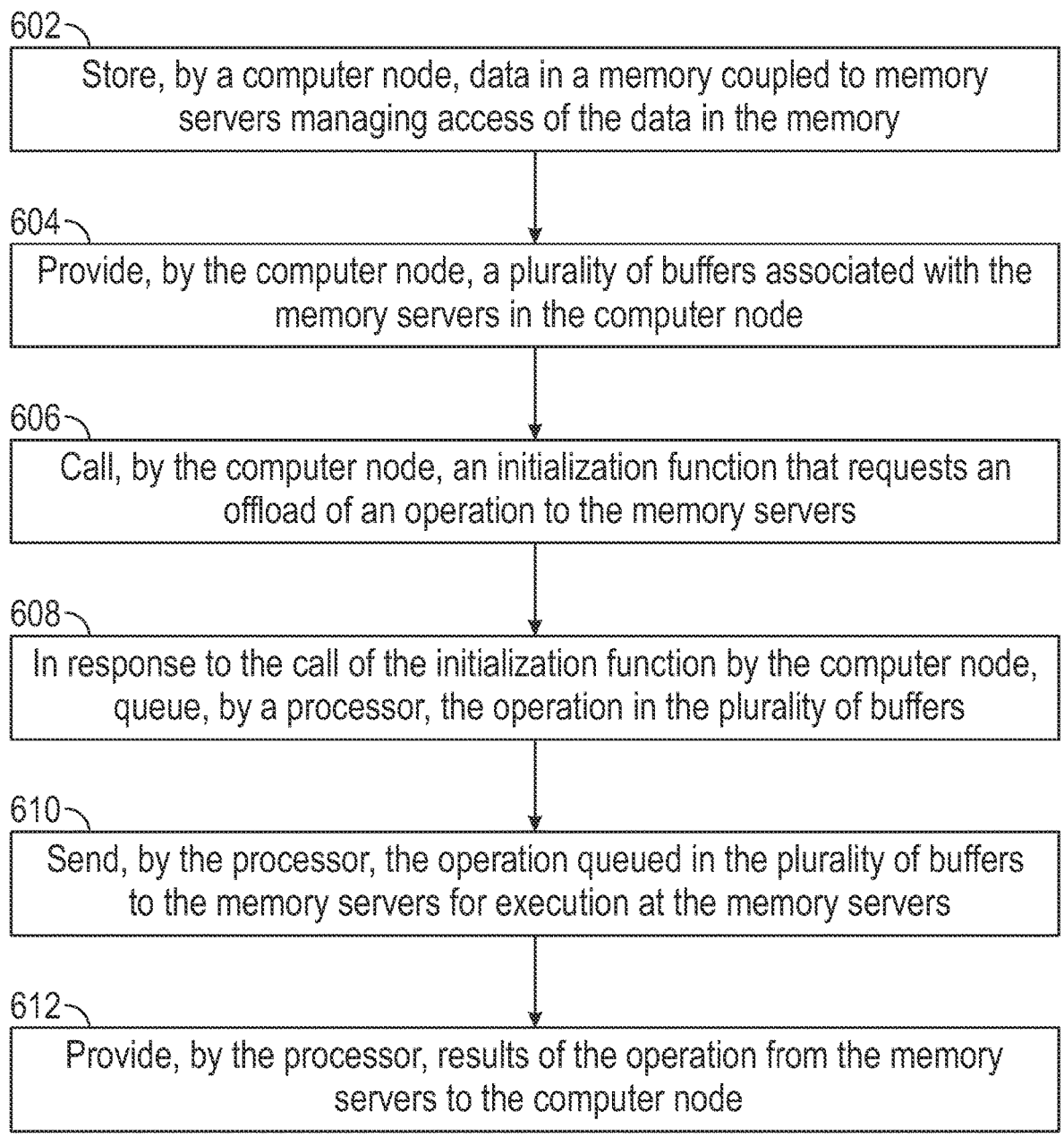
FIG. 6 is a flow diagram of a flow to offload an operation to memory servers, according to some examples.

FIG. 6 depicts a flow for offloading an operation to memory servers of a FAM. The flow of FIG. 6 includes storing (at 602), by a computer node, data in memory coupled to memory servers managing access of the data in the memory. The memory servers can be part of a FAM, such as the FAM 106 of FIG. 1.

The flow includes providing (at 604), by the computer node, a plurality of buffers associated with the memory servers in the computer node. Providing a buffer in a computer node can refer to allocating a portion of a memory to include the buffer. The plurality of buffers can be included in a local memory of the computer node.

The flow includes calling (at 606), by the computer node, an initialization function that requests an offload of an operation to the memory servers. Calling an initialization function can refer to causing an invocation of the initialization function. In some examples, the initialization function can be the queuing function 122-1 or 122-N of FIG. 1, for example. The initialization function can be called by accessing a programming interface, for example.

The flow includes in response to the call of the initialization function by the computer node, queuing (at 608), by a processor, the operation in the plurality of buffers. Queuing an operation into a buffer can refer to adding, to the buffer, information that allows the operation to be performed. For example, queuing the operation in the plurality of buffers includes accumulating operation elements of the operation in the buffers.

The flow includes sending (at 610), by the processor, the operation queued in the plurality of buffers to the memory servers for execution at the memory servers. Sending the operation to a memory server can refer to transmitting information of the operation so that the memory server can execute the operation. For example, the sending can be performed by the send function 124-1 or 124-N of the programming interface 120-1 or 120-N of FIG. 1, for example.

The flow includes providing (at 612), by the processor, results of the operation from the memory servers to the computer node. For example, the results can be obtained by the computer node from the memory servers when a wait object, waitObj, indicates a completion status of the operation.

Figure 7:
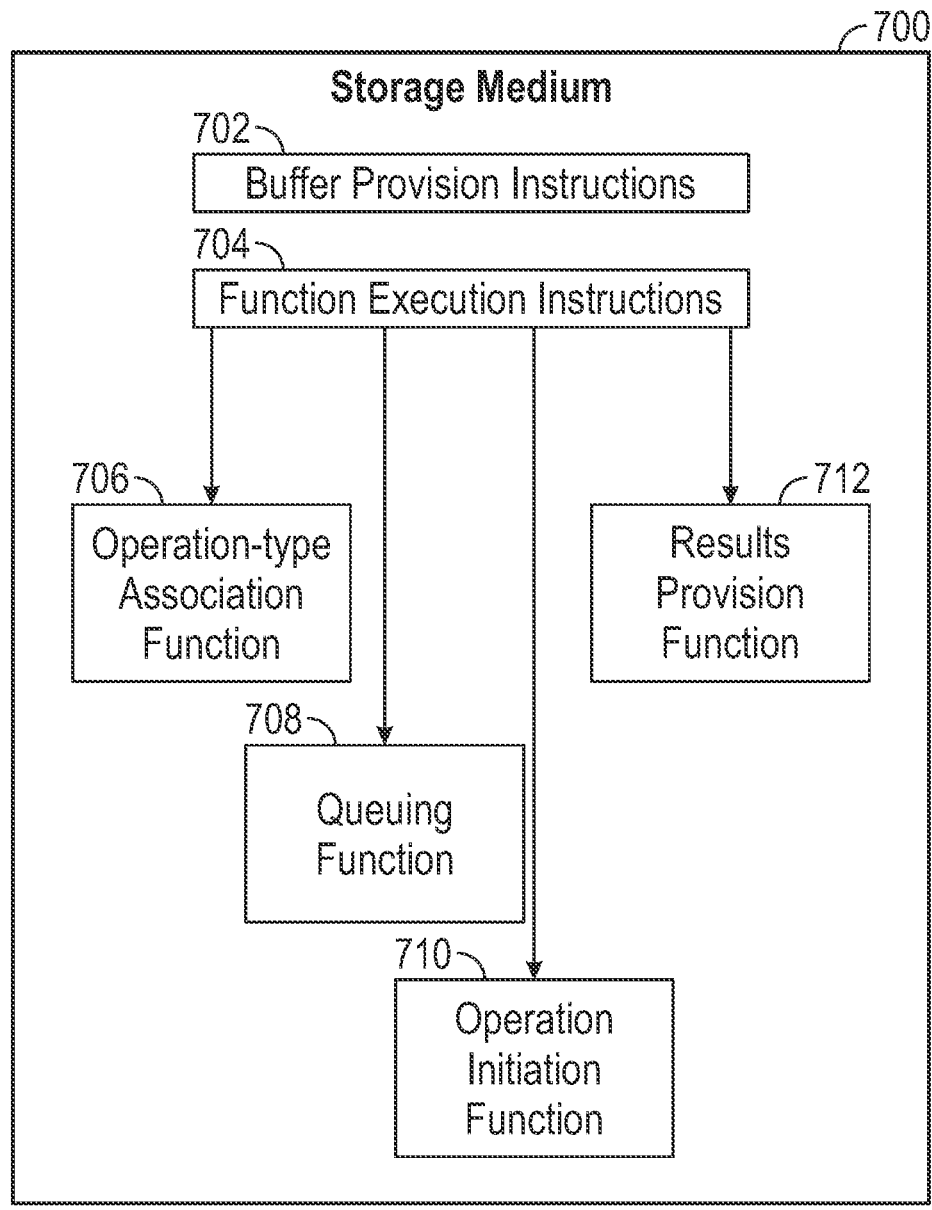
FIG. 7 is a block diagram of a storage medium storing machine-readable instructions according to some examples.

FIG. 7 is a block diagram of a non-transitory machine-readable or computer-readable storage medium 700 storing machine-readable instructions that upon execution cause a computer node to perform various tasks.

The machine-readable instructions include buffer provision instructions 702 to provide a plurality of buffers in the computer node. The plurality of buffers are associated with memory servers of a network-attached memory (e.g., the FAM 106 of FIG. 1).

The machine-readable instructions include function execution instructions 704 to execute a plurality of functions accessible by a processing element in the computer node to access the data of the memory servers.

The plurality of functions include an operation-type association function 706 associating, with the plurality of buffers, information specifying a type of an operation to be performed on the data using the plurality of buffers. The information can include a buffer descriptor, for example.

The plurality of functions include a queueing function 708 queuing the operation in the plurality of buffers, and an operation initiation function 710 initiating an execution of the operation, based on the type specified by the information, at the memory servers associated with the plurality of buffers.

The plurality of functions include a results provision function 712 providing results of the operation from the memory servers to the computer node. The results provision function 712 can access a wait object, for example.

A storage medium (e.g., 700 in FIG. 7) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a plurality of memory servers managing access of data in a memory;
a computer node;
a plurality of buffers in the computer node, wherein the plurality of buffers are associated with the memory servers; and
a processor in the computer node configured to execute a plurality of offload-related functions based on a request from a processing element in the computer node, the offload-related functions executed to offload computations from the computer node to the memory servers, the plurality of offload-related functions comprising:
associating, with the plurality of buffers, information specifying a type of an operation offloaded from the computer node to the memory servers,
queueing operation elements of the operation in the plurality of buffers, wherein an operation element of the operation elements comprises a data value and a memory address of a memory server at which the operation offloaded to the memory server is applied on the data value,
initiating an execution of the operation, based on the type specified by the information, at the memory servers associated with the plurality of buffers, the initiating comprising sending the operation elements from the plurality of buffers to the memory servers, and
providing results of the operation from the memory servers to the computer node.

2. The system of claim 1, wherein the plurality of offload-related functions are accessible by the computer node using a programming interface.

3. The system of claim 2, wherein the plurality of offload-related functions comprise a queuing function that queues the operation elements of the operation in the plurality of buffers in response to a call of the programming interface by the computer node, wherein the queueing function comprises an opcode representing the type of the operation, a descriptor representing a memory address space in which the operation is to be applied, and a set of the operation elements.

4. The system of claim 2, wherein the plurality of offload-related functions comprise a send function that sends the queued operation elements of the operation from the plurality of buffers to the memory servers in response to a call of the programming interface by the computer node.

5. The system of claim 1, wherein the processor is configured to queue operation elements of a further operation of a given type in the plurality of buffers based on a pattern of activities in the computer node indicating that a quantity of requests relating to operations of the given type exceeds a quantity threshold, or an amount of data to be processed for the requests relating to the operations of the given type exceeds a size threshold.

6. The system of claim 1, wherein the processor is configured to queue operation elements of a further operation of a given type in the plurality of buffers based on a performance hint in the computer node, the performance hint indicating a performance goal when performing the operation of the given type.

7. The system of claim 3, wherein the associating of the information specifying the type of the operation comprises saving information of the opcode and memory addresses of the plurality of buffers into a buffer descriptor in a local memory of the computer node.

8. The system of claim 7, wherein the processor sends a collection of operation elements of the operation from a buffer of the plurality of buffers to a first memory server by:
retrieving the buffer descriptor associated with the buffer; and
adding the information of the opcode from the buffer descriptor and the collection of operation elements to a queue in the first memory server.

9. The system of claim 1, wherein the computer node is a first computer node, the system further comprising:
a second computer node including a plurality of buffers associated with the memory servers, wherein a processor of the second computer node is configured to execute a plurality of second computer node offload-related functions comprising:
queuing operation elements of a second operation in the plurality of buffers in the second computer node, and
initiating an execution of the second operation at the memory servers by sending the queued operation elements of the second operation from the plurality of buffers in the second computer node to the memory servers.

10. The system of claim 1, wherein the sending of the operation elements from the plurality of buffers to the memory servers comprises writing a collection of operation elements of the operation to a queue of a first memory server of the memory servers, and wherein the processor is configured to:
detect a completion of the writing of the collection of operation elements to the queue of the first memory server; and
return a wait object to the processing element in response to detecting the completion.

11. The system of claim 10, wherein the processor is configured to:
determine a status of the wait object corresponding to a status of a memory-side operation performed at the first memory server based on the collection of operation elements; and
obtain, based on a completion of the memory-side operation, a result of the memory-side operation from a completion queue of the first memory server.

12. The system of claim 1, wherein the processor is configured to:
for a first operation element of the operation elements, identify a memory server of the memory servers for a memory address contained in the first operation element;
identify a first buffer for the identified memory server; and
append the first operation element to the first buffer.

13. The system of claim 12, wherein the identifying of the first buffer for the identified memory server is based on mapping information correlating buffers to corresponding memory servers.

14. A method comprising:
storing, by a computer node, data in a memory coupled to memory servers managing access of the data in the memory;

providing, by the computer node, a plurality of buffers associated with the memory servers in the computer node;

providing, at the computer node, offload-related functions executed to offload computations from the computer node to the memory servers, the offload-related functions comprising an initialization function and a send function;

calling, by the computer node, the initialization function that requests an offload of an operation to the memory servers;

based on the call of the initialization function by the computer node, queuing, by a processor, operation elements of the operation in the plurality of buffers, wherein an operation element of the operation elements comprises a data value and a memory address of a memory server at which the operation offloaded to the memory server is applied on the data value;

based on calling the send function, sending, by the processor, the operation elements of the operation queued in the plurality of buffers to the memory servers for execution at the memory servers; and providing, by the processor, results of the operation from the memory servers to the computer node.

15. The method of claim 14, wherein the initialization function comprises an opcode representing a type of the operation, a descriptor representing a memory address space in which the operation is to be applied, and a set of the operation elements.

16. The method of claim 15, further comprising:
saving information of the opcode and memory addresses of the plurality of buffers into a buffer descriptor in a local memory of the computer node.

17. The method of claim 16, comprising:
sending, from the processor, a collection of operation elements of the operation from a buffer of the plurality of buffers to a first memory server by:
retrieving the buffer descriptor associated with the buffer; and
adding the information of the opcode from the buffer descriptor and the collection of operation elements to a queue in the first memory server.

18. The method of claim 14, wherein the sending of the operation elements of the operation to the memory servers comprises writing a collection of operation elements from a buffer of the plurality of buffers to a queue of a first memory server of the memory servers, the method comprising:
detecting, by the processor, a completion of the writing of the collection of operation elements to the queue of the first memory server; and
returning, by the processor, a wait object to a processing element of the computer node in response to detecting the completion.

19. A non-transitory machine-readable storage medium comprising instructions that upon execution cause a computer node to:
provide a plurality of buffers in the computer node, wherein the plurality of buffers are associated with memory servers of a network-attached memory;
execute a plurality of offload-related functions accessible by a processing element in the computer node to offload computations from the computer node to the memory servers, the plurality of offload-related functions comprising:
associating, with the plurality of buffers, information specifying a type of an operation offloaded from the computer node to the memory servers,
queueing operation elements of the operation in the plurality of buffers, wherein an operation element of the operation elements comprises a data value and a memory address of a memory server at which the operation offloaded to the memory server is applied on the data value,
initiating an execution of the operation, based on the type specified by the information, at the memory servers associated with the plurality of buffers, the initiating comprising sending the operation elements from the plurality of buffers to the memory servers, and
providing results of the operation from the memory servers to the computer node.

20. The non-transitory machine-readable storage medium of claim 19, wherein the plurality of offload-related functions comprise functions of a programming interface.

* * * * *